July 14, 1942.    G. DE W. GRAVES    2,289,774
PROCESS AND APPARATUS FOR SHAPING POLYMERIC MATERIALS
Filed June 30, 1939    2 Sheets-Sheet 1
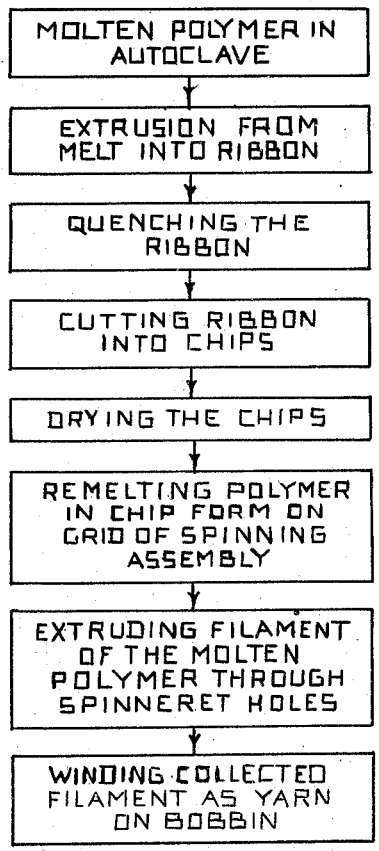
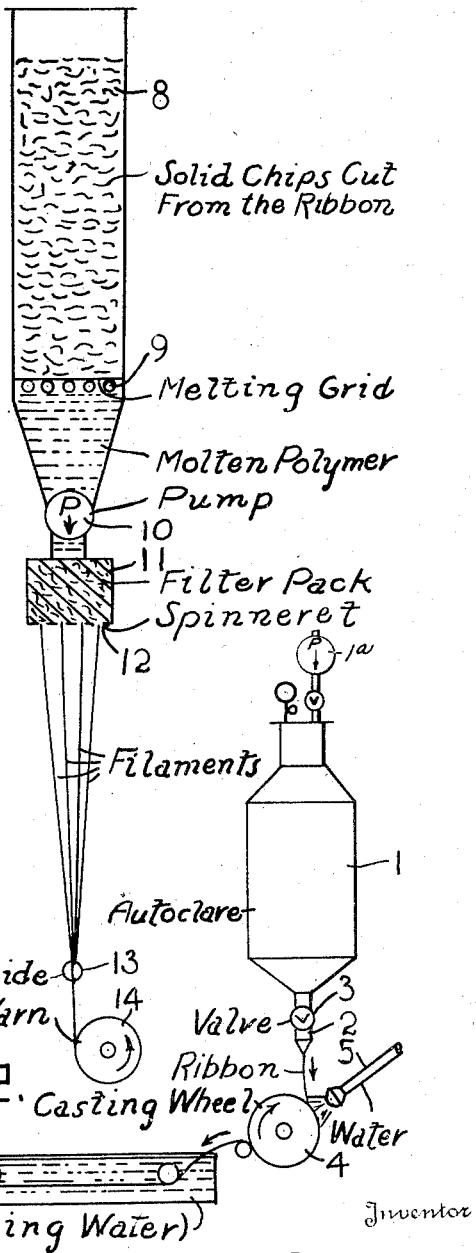
Inventor
George DeWitt Graves
By R. F. Miller
Attorney July 14, 1942.  G. DE W. GRAVES  2,289,774
PROCESS AND APPARATUS FOR SHAPING POLYMERIC MATERIALS
Filed June 30, 1939  2 Sheets-Sheet 2
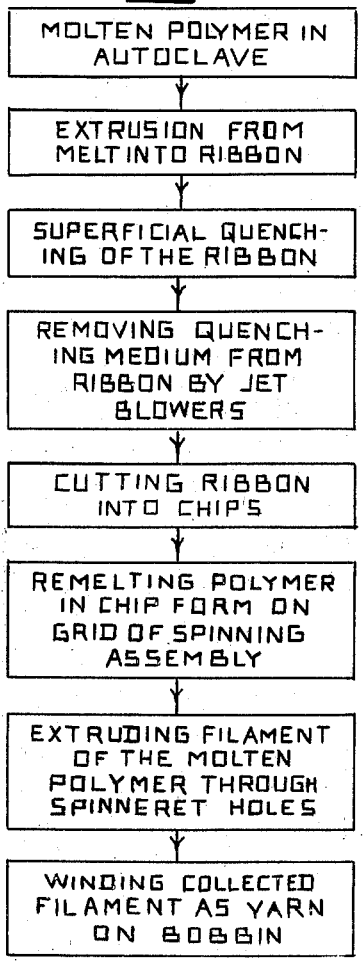
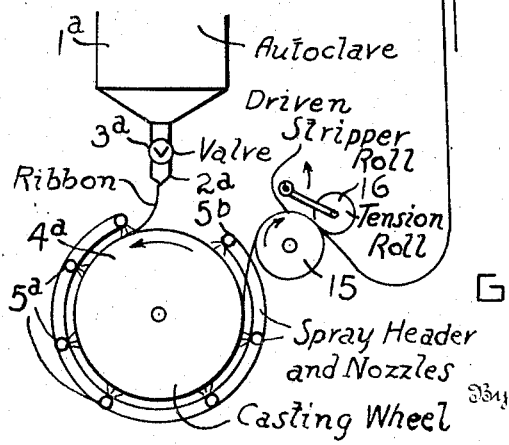
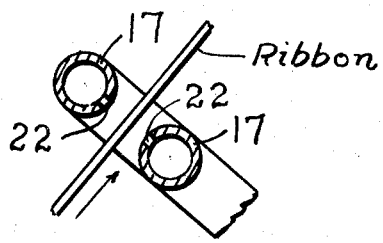
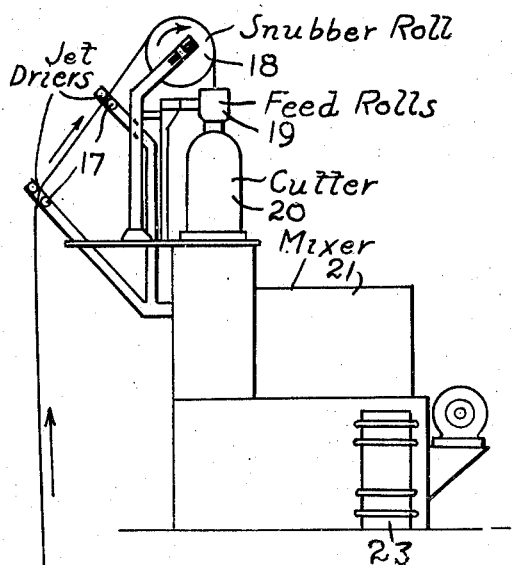
Inventor
George DeWitt Graves
R. F. Miller
Attorney Patented July 14, 1942

2,289,774

UNITED STATES PATENT OFFICE 2,289,774

PROCESS AND APPARATUS FOR SHAPING POLYMERIC MATERIALS

George De Witt Graves, Wilmington, Del., assignor to E. I. du Pont de Nemours & Company Wilmington, Del., a corporation of Delaware Application June 30, 1939, Serial No. 282,266

7 Claims. (Cl. 18—15)

This invention relates to polymeric materials and more particularly to fiber-forming synthetic linear polymers.

This application is a continuation-in-part of my application Serial Number 223,998, filed August 9, 1938.

The synthetic linear polymers with which this invention is particularly concerned are described in Patents 2,071,250, 2,071,252, 2,071,253, and 2,130,948. These polymers are capable of being extruded into filaments which upon cold drawing, that is, being permanently elongated on application of stress in the solid state, exhibit molecular orientation along the fiber axis. The most valuable of these fiber-forming polymers are the polyamides which are obtainable from the polymerization of monoaminomonocarboxylic acids or from the reaction of diamines with dibasic carboxylic acids.

These polymers are best prepared without a solvent and under conditions so that at the end of the polymer-making cycle, the material is in the state of a very viscous liquid only 10° to 20° C. above its solidification temperature. The problem of removing the polymer mass from the autoclave at this point presents a number of difficulties. The polymer darkens readily by air-oxidation at elevated temperatures, and it cannot be held very long at elevated temperatures in the autoclave because it tends to decompose which may affect its dyeing properties and viscosity. This makes it undesirable to spin the polymer directly from the autoclave in which it is prepared. On the other hand, the high viscosity of the polymer and its nearness to the solidification temperature make transportation through pipes to the spinning machines impractical at any but very short distances.

The polymer cannot in avoidance of the above-mentioned difficulties be run out of the autoclave and collected as lumps or cast into molded blocks satisfactorily because such large pieces are too difficult to break up into smaller pieces. The extreme toughness of the material is quite unlike that of resinous materials and thermoplastics. Furthermore, although the polymers are inherently crystalline, they cannot, like most crystalline materials and many resins, be obtained in a granular form by running the molten polymer into a liquid non-solvent therefor. When this is done the polymer separates from the liquid as a stringy fibrous mass, tough and practically incapable of subdivision to uniform size. In other words, the fiber-forming properties of the polymers render this method impractical.

This invention has as an object the preparation of fiber-forming polymers in a suitable form for melt spinning. Another object is a convenient and successful method for transferring the molten polymer synthesized in the reaction vessel to the spinning apparatus without decomposition or darkening of the polymer through oxidation. A further object is to provide an improved method of manufacturing filaments and fibers from fiber-forming polymers. Other objects will appear hereinafter.

These objects are accomplished by the following invention which includes the steps of extruding the molten fiber-forming polymer as a ribbon from an autoclave, e. g., the vessel in which the polymer is formed, cooling the ribbon by means of a liquid non-solvent for the polymer, preferably removing the retained liquid from the surface of the ribbon, cutting the ribbon into small pieces or flakes adapted to be fed into the hopper of a melt spinning apparatus containing a heated grid which sustains the column of flake polymer above it but which permits the polymer melted by the grid to flow through it to the spinneret below.

Apparatus for carrying out the invention is shown diagrammatically in the accompanying drawings in which Fig. 1 is a flow sheet indicating the steps included between the production of the molten polymer and its formation into filaments, fibers, or yarn;

Fig. 2 is a view in elevation showing the formation of the ribbon from the molten polymer and the quenching of the ribbon;

Fig. 3 shows a type of spinning apparatus suitable for converting the flake polymer into fibers;

Fig. 4 is a flow sheet of another method of carrying out the invention;

Fig. 5 is a view in elevation of apparatus used in carrying out the process shown in Fig. 4; and Fig. 6 is an enlarged view of the jet driers.

After the polymer-forming reaction has taken place in the suitably heated autoclave 1, the molten material is extruded (under gas pressure or by means of a pump) as a ribbon from a slot of about two inches length and $\frac{1}{16}$ to $\frac{1}{8}$ inch width formed in the lower end of the reduced extension 2 of the autoclave. The character 1a indicates a source or supply of gas under pressure which leads into the autoclave through a valved line as shown. A valve 3 is provided to shut off or regulate the flow of the molten polymer. The extruded ribbon of the viscous melt flows on the rim of a positively driven drum or casting wheel 4. This drum is preferably a hollow metallic cylinder cooled by water flowing through it. Streams and sprays of water from the nozzle 5 are preferably directed against the ribbon and the rim of the wheel. The solid but still hot ribbon is pushed by the casting wheel and/or drawn by the wind-up device through a trough 6 of cooling water and as it emerges from the water trough it is wound on a reel 7.

The ribbon from the reel is then cut on a cutter, not shown, which may be one of several known types. A cutter of the automatic punch-press variety, which is satisfactory, cuts the ribbon into squares having sides averaging about ¼ inch. Ribbon from the 1/16 inch slot, the ribbon usually being thinner than the width of the slot, can be fed directly from the reel to the cutter. Ribbon from the ⅛ inch slot is more brittle, since it is more difficult to cool rapidly. This type of ribbon may be preheated as it passes from the reel to the cutter in order to render it more pliable and thus prevent irregular breakage and splitting by the operation of the cutter. This preheating (say 75°–100° C.) can be effected by passing the ribbon through a heated tube, by subjecting it to the action of steam, or by other methods.

Whether the ribbon is steamed or not, this process leaves a certain amount of moisture in the cut product which necessitates drying to give a product suitable for melt spinning. The drying of the cuttings is conveniently accomplished in a rotary tumbler at 90°–110° C. by blowing hot air or other gas over the moving material for some hours. Temperatures above 110° C. tend to discolor the product and should be avoided unless oxygen is excluded. The tumbling operation during drying serves as a good means for blending polymer from different batches.

The embodiment illustrated in Figs. 4 and 5 presents several advantages over that described above. Fig. 4 includes the steps in this form of the invention between the production of the molten polymer and its formation into filaments, fibers or yarn. Fig. 5 illustrates the formation of the ribbon from the molten polymer, superficial quenching of the ribbon by means of water, removing the surface moisture by means of air from jet blowers, cutting the ribbon, and mixing the cut polymer.

According to this preferred process, the molten polymer as previously described is extruded under pressure from the autoclave 1a through the valve 3a and through a slot of about 3 inches length and ⅛ inch wide situated in the lower end of the nozzle 2a. The extruded polymer is collected as a ribbon on the positively driven metal drum or casting wheel 4a. Streams or sprays of water from several nozzles 5a are directed against the ribbon and the rim of the casting wheel. The spray from one nozzle 5b is directed on the casting wheel between the point where the ribbon is removed from the wheel and the point where the extruded polymer first strikes the wheel. The solid but hot, flexible ribbon, after it is carried part way around the casting wheel, is removed by the stripper roll 15 which has a peripheral speed somewhat greater than that of the casting wheel. After passing over the stripper roll, the ribbon passes under tension roll 16 up through two or more jet blowers from which air or other gas is directed from the holes 22 (see Fig. 6) therein on the surface of the ribbon to remove the surface moisture. After passing the jet blowers, the substantially dry but still hot ribbon is passed over snubber roll 18, down through the feed rolls 19 into the cutter 20. From the cutter the polymer pieces drop into the mixer-blender 21. After thorough mixing the polymer is ready for melt spinning or can be stored for subsequent use in drums 23.

It will be noted that in the process illustrated in Fig. 5, the cooling of the ribbon is not effected by immersing the ribbon in water but by spraying water on the ribbon and casting wheel. By this procedure the surface of the ribbon is cooled sufficiently to prevent discoloration by oxidation but the temperature of the interior of the ribbon is kept considerably above the boiling point of water. The temperature of the ribbon is controlled by three factors: (a) the rate of extrusion from the autoclave, (b) the speed and size of the casting wheel, and (c) the amount of water used. By controlling these factors so that the average temperature of the ribbon is kept above 100° C., but preferably not above 150° C., penetration of the ribbon by the water is prevented. The ribbon is, however, cooled sufficiently to prevent discoloration. When the ribbon passes the jet blowers the moisture on the surface is removed so that the ribbon is substantially dry when it leaves the blowers. The small amount of moisture that may remain is removed by evaporation before the hot ribbon reaches the cutter. The fact that the ribbon is still hot when it reaches the cutter facilitates the cutting operation.

The process of Fig. 5 constitutes the preferred procedure because of its simplicity and speed. It eliminates the quenching trough and reel of Fig. 2, and most important of all it obviates the necessity of a separate drying operation. By the process of Fig. 5, a 300-lb. batch of polymer can be cast, cut, and assembled ready for spinning in less than an hour.

Fig. 3 illustrates a melt spinning assembly useful for preparing filaments, bristles, and the like from the polymer pieces or chips. The chips are fed into the hopper 8. In the spinning assembly below the hopper is a grid 9 which is heated above the melting point of the polymer and which supports the column of solid polymer chips above it. The molten polymer flows through the holes or spaces in the grid to a pump 10 which provides the necessary pressure for forcing the molten polymer through the filter pack 11 and out through the openings of the spinneret 12. The filaments from the several spinneret openings are gathered by the collector guide 13 into a yarn which is wound on a bobbin 14. The use of a grid in melting polymers for spinning is being covered specifically in my application Serial Number 223,997, filed August 9, 1938.

The invention is further illustrated by the following specific examples:

*Example I*

In an electrically-heated autoclave the following charge is placed: 57.77 pounds (26.2 kg.) hexamethylene diammonium adipate, 0.212 pound (0.096 kg.) acetic acid, and 24.7 pounds (11.2 kg.) water. The temperature inside after 1.5 hours' heating reaches 219° C. and the pressure 250 pounds per sq. in. The pressure is held constant by release of steam for two hours while the temperature rises to 270° C. The pressure is then slowly released at such a rate as to keep the temperature near 270° C. At atmospheric pressure the temperature is held substantially constant for half hour, then the molten polymer, polyhexamethylene adipamide, is extruded at 275° C. through 2 x 1/16 inch slot by opening a special valve and putting 150 pounds nitrogen pressure on the autoclave. The apparatus used is that shown in Fig. 2. The molten polymer coming from the slot flows through a few inches of air space onto a water-cooled drum where it solidifies and is carried by the revolving drum to the cooling water trough. From the trough it is wound up on a reel. The extrusion time is 15 minutes. From the reel it is fed directly to a punch-press cutter. The cuttings are dried for several hours to a moisture content just below 0.2%. The spinning of the flake polyamide into yarn is accomplished as described in connection with Fig. 3 of the drawings.

*Example II*

Into an autoclave provided with a Dowtherm vapor heating jacket at 290° C., there is pumped a reaction mixture of essentially the same composition as that used in Example I, but the total quantity of reaction mixture is five times as large. After a similar polymer-making cycle, the product is converted into chips employing the apparatus shown in Fig. 2. The molten polymer is extruded through a 2 x 1/8 inch slot on the casting wheel, is cooled in a water trough, and wound on a reel. The ribbon is considerably thicker than in Example I and is less tough. To improve its cutting qualities, it is heated with direct steam as it is fed to the punch-press cutter. In this case the cuttings are actually visibly wet. After several hours in the tumbler-dryer at about 100° C., the moisture content is reduced to 0.5%. The batch is then blended with another one and the whole mixture of the cut flake is dried in the tumbler until the moisture content is below 0.2%. The final material, in order to insure its successful spinning into fibers when desired, is stored in sealed containers to prevent reabsorption of moisture.

*Example III*

A 300-pound charge of molten polyhexamethylene adipamide is extruded from a hot autoclave employing the apparatus shown in Fig. 5. The polymer at a temperature of 275° C. is extruded under about 30 pounds oxygen-free nitrogen pressure through a 3 x 1/8 inch slot. The molten polymer coming from the slot flows through an air space of about half an inch onto a revolving casting wheel where it is solidified by cooling with water. The casting wheel has a width of 10 inches and a diameter of 48 inches. The water is sprayed on the polymer ribbon and the casting wheel from jets. From the casting wheel the ribbon is passed over a stripper roll, under a tension roll, and then past jet driers from which a stream of air is blown on the ribbon. The ribbon is next fed by means of corrugated feed rolls into a rotary cutter where it is cut into pieces having an average width and length of 1/4 inch and a thickness somewhat less than 1/8 inch. From the cutter the pieces are dropped into a mixer. The product has a moisture content below 0.4% and can be spun directly without drying.

Although the invention is illustrated in the above examples by a polyamide of the diamine-dibasic acid type, that is, a polyamide obtained from a diamine and a dibasic carboxylic acid or an amide-forming derivative thereof, the invention is applicable also to polyamides obtained from polymerizable amino acids or their amide-forming derivatives, e. g., lactams, and to other synthetic linear condensation polymers, e. g., those described in the above mentioned patents. It will be apparent that the process of the invention is applicable also to polymers containing modifying agents such as delusterants, pigments, plasticizers, etc. This invention is, furthermore, applicable generally to synthetic polymers capable of being spun from melt. An example of an additional synthetic material of this kind is the solid polymer of ethylene made as described in U. S. Patent No. 2,153,553.

The chips have been described as cut from a ribbon, which in the present instance refers to a sheet of any width since it will be apparent that the polymer, although less conveniently, can be extruded into sheets of width greater than that usually referred to as a ribbon, and chips or flakes cut from such sheets. It is also within the scope of the invention to extrude the polymer in the form of thin rods and to break these rods into short ends as in the case of ribbon.

Since certain polymers are sensitive at elevated temperatures to oxygen, it is sometimes desirable to effect the extruding operation in an atmosphere of nitrogen or other inert gas. Although it is preferable to form the ribbon on a casting drum, it is possible to form a ribbon without the use of a drum by extruding the polymer directly from a narrow slot into the quenching liquid. Another procedure is to extrude the polymer between rollers submerged in the quenching medium. If desired, casting drums or rollers having grooved or grid surfaces can be used to aid in the subsequent breaking of the ribbon into small pieces or flakes. The quenching medium retained on the ribbon can be removed before cutting by blowing with air or other gas, by passing the ribbon between squeeze rolls, or by other means.

The preferred quenching medium is water but any liquid which has little or no solvent or degrading action on the polymer under the conditions of operation may be used. Suitable examples in the case of polyamides are alcohols, such as methanol, ethanol and butanol, hydrocarbons, and chlorinated hydrocarbons. Although it is desirable that the quenching medium be at ordinary or subnormal temperatures, quenching can be effected at moderately elevated temperatures, e. g., 100° C. The rapid chilling of the ribbon can also be accomplished, though less effectively, without a quenching liquid, by extruding the polymer on a cold belt or between two metal endless belts cooled on their reverse sides so as not to wet the polymer. Or the ribbon can be cooled by refrigerated air, cooled brine, or in an inert gas or vapor.

The invention is not limited to the use of any given type of cutter. Rotary knife type cutters, e. g., a Ball and Jewell cutter, have the advantage of great speed and although the pieces do not have uniform size or shape, the amount of the finer pieces can be minimized and limits set so that a product is obtained which is satisfactory for the present purpose. For use in some cutters it is desirable first to slit the ribbon into narrow strips. The size of the pieces should be such that they are supported on the grid used in melt spinning and do not run through in any substantial amount. The pieces or flakes should, for the best results, have a surface area within the range of 0.02 sq. in. to 1.00 sq. in. The thickness of the flakes is preferably in the range from 0.05 to 0.20 inch.

Several important advantages follow from the practice of this invention. The conversion of the initial molten polymer into small pieces simplifies the blending of different batches of polymer. This blending, which is conveniently accomplished in a tumbling barrel or dryer, contributes to the uniformity of the ultimately spun products. The thin chip form of the polymer greatly facilitates drying. The maximum moisture content tolerated for good spinnability from melt in the case of most polymers is not over 0.5%, as determined by loss of weight of a sample melted in vacuum. An important feature of this invention is that it provides a convenient and rapid method for converting polymer into a suitable form for melt spinning. This is particularly true of the process illustrated in Fig. 5 and described in Example III. Another valuable advantage resides in the fact that the chips or flakes of the polymer can be melted readily on the grid of the spinner and, through the use of substantially uniformly shaped and sized pieces, without danger of small pieces falling through the grid openings in the unmelted state. The pieces or flakes have the additional advantage of being easily transferred by gravity feed devices to the melt-grid of the spinner or by screw conveyors. Furthermore, the smooth surface of the flake promotes melting without entrapping of gas.

As many apparently widely different embodiments of this invention may be made without departing from the spirit and scope thereof, it is to be understood that I do not limit myself to the specific embodiments thereof except as defined in the appended claims.

I claim:

1. A process for converting fiber-forming synthetic linear polymers into a form capable of being readily cut into small pieces for feeding into a melt spinning assembly, which comprises extruding the molten polymer in ribbon form on a revolving casting wheel, spraying non-solvent for the polymer on the wheel and the ribbon while in contact with the wheel, removing the ribbon from the wheel before the ribbon has made a complete revolution, and blowing air over the ribbon to remove the non-solvent from the surface of the ribbon.

2. The process set forth in claim 1 wherein said polymer is a polyamide and the non-solvent is water, the quantity of which used is insufficient to reduce the internal temperature of the ribbon below 100° C.

3. The process set forth in claim 1 in which said polymer is a synthetic linear polyamide obtainable by condensation polymerization from a diamine and a dibasic carboxylic acid.

4. The process set forth in claim 1 in which said polymer is a polyamide.

5. In an apparatus for obtaining fiber-forming synthetic polymer in a form capable of being readily cut into small pieces for feeding into a melt-spinning assembly, a reservoir for maintaining the polymer in a molten condition, a nozzle having a slot orifice connected with said reservoir, means for applying pressure to the molten polymer to extrude it under pressure in the form of a ribbon through the orifice in said nozzle, a positively driven casting wheel the surface of which receives the extruded polymer, means for directing against the ribbon a spray of cooling liquid in amount which is insufficient to completely cool the ribbon and which permits removal of the ribbon from the casting wheel while the ribbon is still hot, and means for applying a stream of air on the surface of the ribbon to remove the surface moisture after the ribbon has left the wheel.

6. The process set forth in claim 1 in which said polymer is a polyamide derived from a polymerizable monoaminomonocarboxylic acid.

7. The process set forth in claim 1 in which said polymer is polyhexamethylene adipamide.

GEORGE DE WITT GRAVES.